(No Model.)
T. P. CORDREY.
STEAM FRUIT CANNER.
No. 409,274. Patented Aug. 20, 1889.
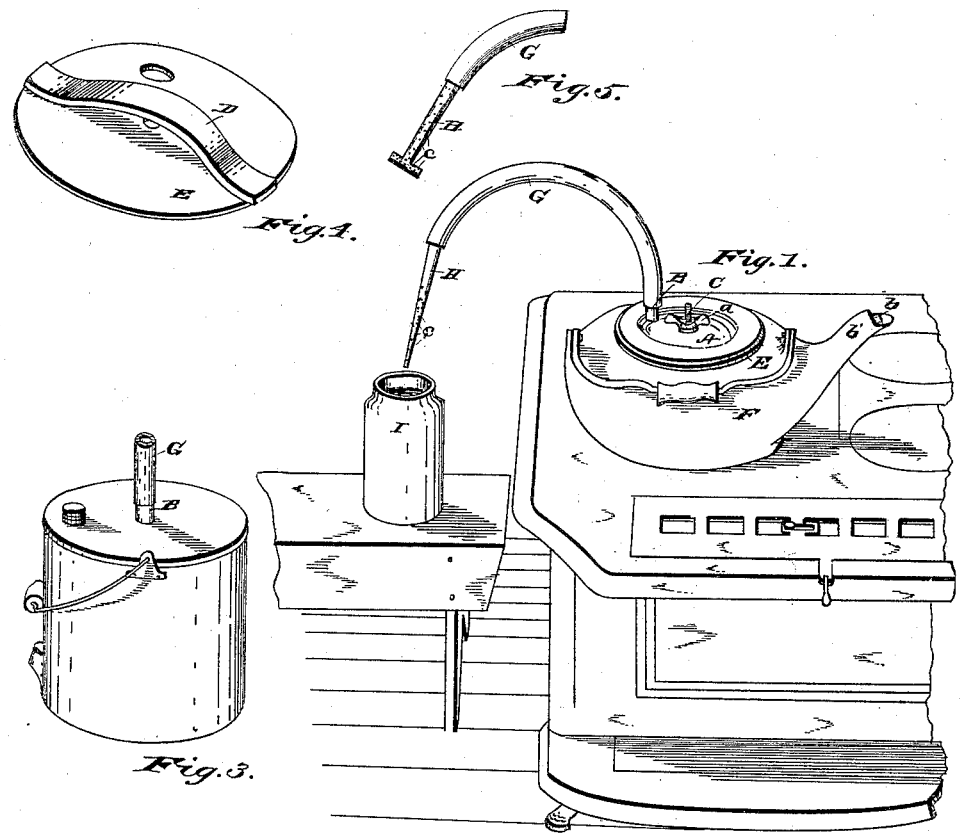
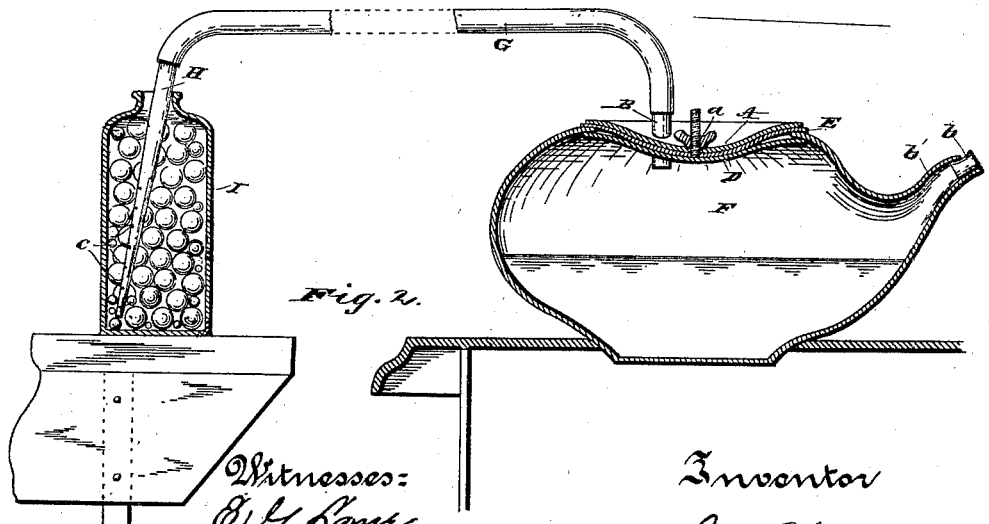
Witnesses:
Inventor
By Thomas P. Cordrey
Bond & Wise
Attorneys.

UNITED STATES PATENT OFFICE.

THOMAS P. CORDREY, OF CANTON, OHIO.

STEAM FRUIT-CANNER.

SPECIFICATION forming part of Letters Patent No. 409,274, dated August 20, 1889.

Application filed March 21, 1889. Serial No. 304,175. (No model.)

*To all whom it may concern:*

Be it known that I, THOMAS P. CORDREY, a citizen of the United States, residing at Canton, in the county of Stark and State of Ohio, have invented certain new and useful Improvements in Steam Fruit-Canners; and I do hereby declare that the following is a full, clear, and exact description of the same, reference being had to the annexed drawings, making a part of this specification, and to the letters and figures of reference marked thereon, in which—

Figure 1 is a view showing my device properly attached to a common tea-kettle and a can or jar placed in proper position to insert the nozzle. Fig. 2 is a view showing sections of a tea-kettle and a can, and the device properly attached. Fig. 3 is a view of a steam-generator. Fig. 4 is an under side view of the gasket and the retaining-bar. Fig. 5 is a modified form of the nozzle.

The present invention has relation to steam fruit-canners; and its nature consists in the different parts and combination of parts, hereinafter described, and particularly pointed out in the claim.

Similar letters of reference indicate corresponding parts in all the figures of the drawings.

In the accompanying drawings, A represents a metallic disk, which is substantially of the form shown in the drawings, and is designed and calculated to fit the opening of an ordinary or common tea-kettle. To the disk A is securely attached the tube B, which is located substantially as shown in Figs. 1 and 2. The screw-threaded post C is securely attached to the retaining-bar D. The retaining-bar D is substantially of the form shown in the drawings, and is calculated to embrace inside of the top or upper portion of a tea-kettle upon its under side, substantially as illustrated in Fig. 2.

The gasket E is attached to the disk A by means of the screw-threaded post C, and is for the purpose of forming a packing between the disk A and the tea-kettle F. For the purpose of preventing the gasket E from becoming displaced the tube B extends through said gasket, as illustrated in Fig. 2. To the tube B is attached the elastic tube G, which may be of any desired length. To the opposite end of the elastic or flexible tube G is attached in any convenient manner the nozzle H.

In use the retaining-bar D is placed in the position shown in Fig. 2, together with the gasket E and the disk A, when the nut $a$ is turned down, thereby securely attaching said parts to the tea-kettle F and at the same time producing a steam-tight connection. The fruit designed to be canned is then placed in the can or jar I, and the nozzle H placed in the position shown in Fig. 2, thereby causing steam to enter the can or jar I and thoroughly cook the fruit contained in said can.

It will be understood that the fruit designed to be canned is placed in the can or jar in its natural state and cooked in the can, after which the nozzle H is removed and the can or jar properly sealed.

In Fig. 5 a modified form of nozzle is shown, which is designed and calculated to be used in cooking apple butter or other fruit butters. In case it is desired, a metal tube can be attached to the short tube B, which is to take the place of the flexible tube G, and in case a metal tube is used the nozzle H may be a continuation of said tube.

In Fig. 3 a modified form of steam-generator is shown, which consists of an ordinary metal can provided with the short tube B. For the purpose of preventing the steam from escaping from the spout of the tea-kettle, the stopper $b$ is placed in the spout $b'$, as illustrated in Fig. 2. For the purpose of causing steam to escape freely from the nozzle H, and at the same time causing the steam to reach all parts of the can or jar, and thereby evenly cook the fruit contained in said can or jar, the perforations $c$ are provided.

For the purpose of preventing the retaining-bar D from rotating while the nut $a$ is being turned, the tube B extends a sufficient distance below the disk A to strike and hold said retaining-bar. It will be seen that the retaining-bar will hold the gasket E in the desired position when the disk A, together with its different parts, is removed from the steam-generator.

Having fully described my invention, what I claim as new, and desire to secure by Letters Patent, is—

The combination of a steam-generator, the disk A, provided with the short metallic tube B, extending above and below the disk A, and below the retaining-bar D, to form a stop for said retaining-bar, the retaining-bar D, provided with the screw-threaded post C, the nut a, and the steam-conveying tube G, provided with the nozzle H, substantially as and for the purpose specified.

In testimony that I claim the above I have hereunto subscribed my name in the presence of two witnesses.

THOMAS P. CORDREY.

Witnesses:
FRED W. BOND,
E. C. SMITH.